June 9, 1942.  W. W. STUART  2,285,749
FLOW CONTROL MECHANISM
Filed Sept. 18, 1940  2 Sheets-Sheet 1
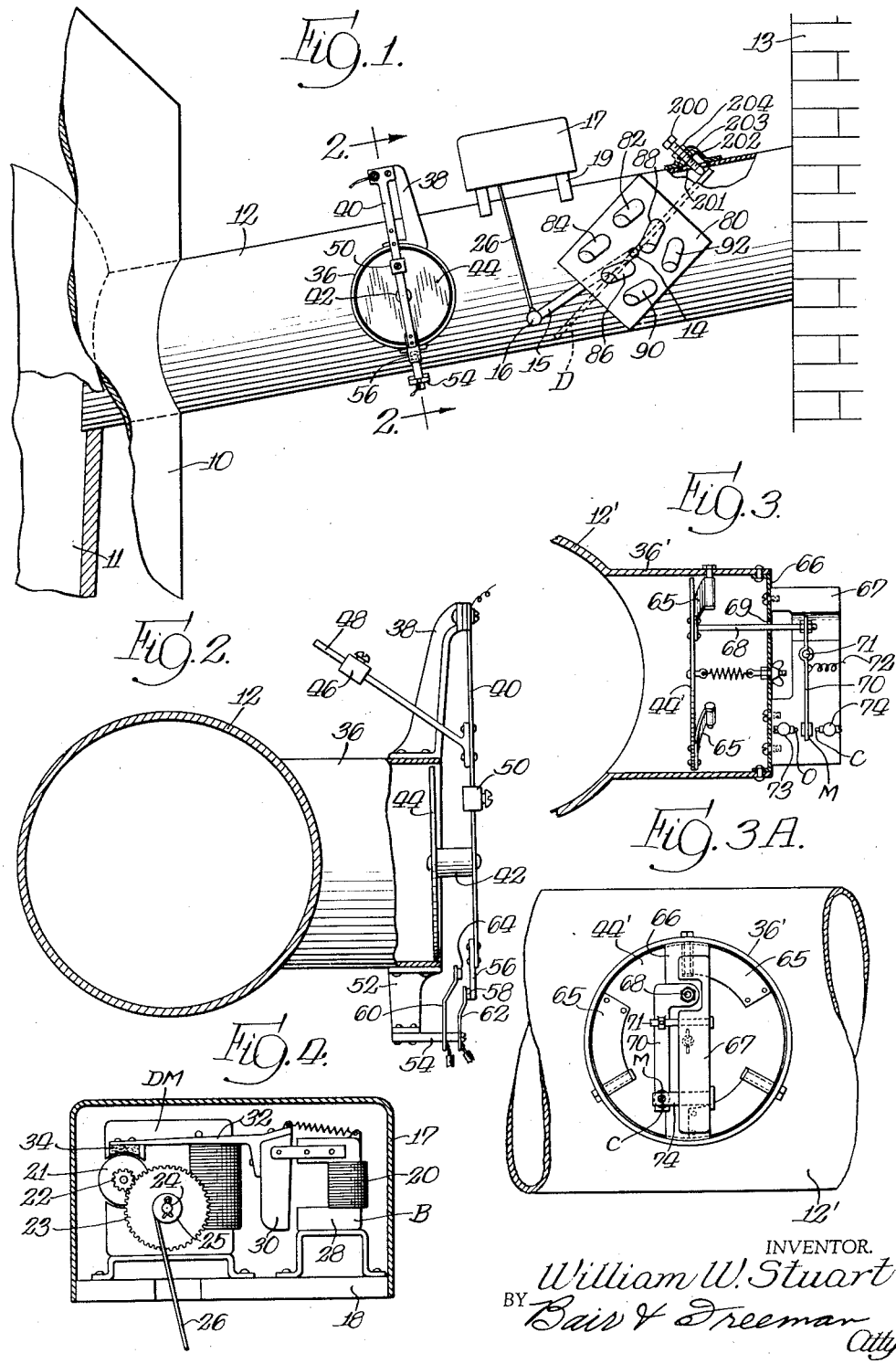
INVENTOR.
William W. Stuart
BY Bair & Freeman
Attys.

June 9, 1942.  W. W. STUART  2,285,749
FLOW CONTROL MECHANISM
Filed Sept. 18, 1940   2 Sheets-Sheet 2
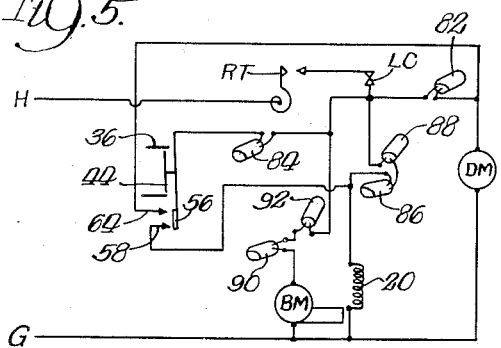
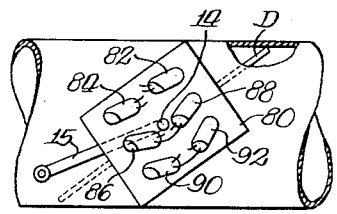
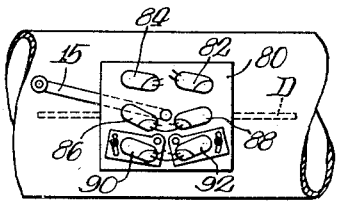
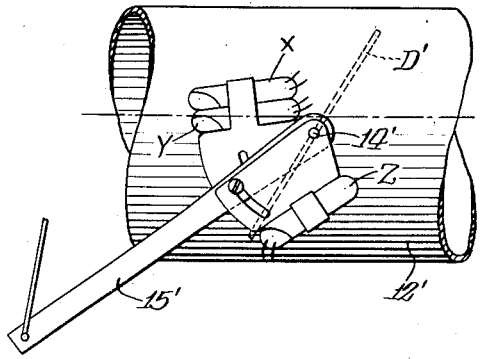
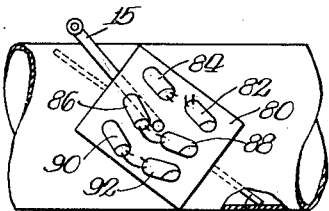
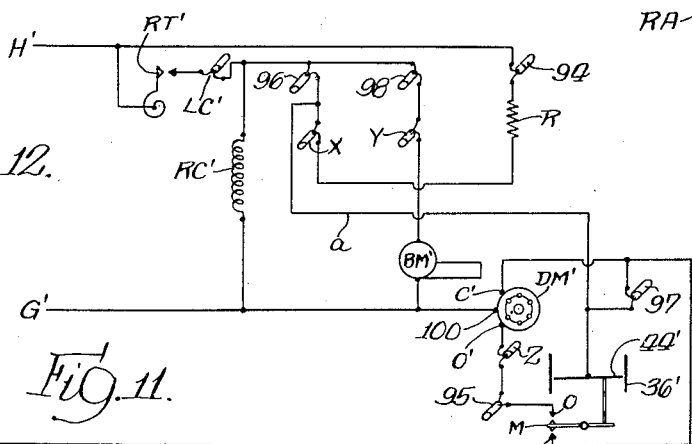
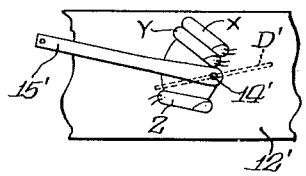
INVENTOR.
William W. Stuart,
BY Bair & Freeman
Attys.

Patented June 9, 1942

2,285,749

UNITED STATES PATENT OFFICE 2,285,749

FLOW CONTROL MECHANISM

William W. Stuart, Des Moines, Iowa

Application September 18, 1940, Serial No. 357,337

11 Claims. (Cl. 236—1)

One object of my invention is to provide a flow control mechanism, whereby, for example, the draft on a furnace is automatically regulated during operation of the furnace and the volume of air moving through combustion gas passages of the furnace is reduced to a minimum during the stand-by period to conserve heat.

A further object is to provide a draft regulator in the form of a damper or the like in a combustion gas passageway and to electrically control the positioning thereof in accordance with draft conditions.

Another object is to provide in combination with a damper in a duct or smoke pipe, a control switch responsive to the pressure in the duct, and arranged to control electric means which in turn positions the damper.

A further object is to provide a simple arrangement of electric motor for opening a damper or valve, and a brake or other suitable means to hold the damper at any opened position, the motor and brake being controlled in accordance with pressure or temperature or other condition.

Another object is to provide a modified construction in which a reversible motor, when energized to rotate in one direction, will open a damper, and when energized to rotate in the opposite direction will close a damper, the motor being controlled by a switch actuated by a pressure sensitive device, the motor being operated at line voltage.

Another object is to provide in a heating system, automatic draft regulation involving the positioning of a damper, coordinated with the control of the burner motor so that the burner motor is not operated except after the damper has been opened sufficiently.

Another object is to provide such equipment of such sensitivity as to make it applicable to domestic heating installations.

Another object is to provide equipment which can be used with "line voltage" throughout or "low voltage" throughout or a combination of line and low voltage.

Still another object is to provide a simple and efficient pressure sensitive control, faster in its action than the conventional controls that use restricted pipe or tube connections.

It is also my purpose to provide a form of control structure in which a flow control damper is arranged to swing beyond wide open position, to permit starting the burner with damper approximately wide open, and to provide a longer purging period and other advantages.

It is an object also to provide such adjustability of parts that the burner can be started before the damper has quite moved to fully open position, so that the damper may be at full open position approximately at the time of the initial puff, whereby the system may be adapted for most efficient operation with different burners and furnaces.

A further object is to provide equipment to achieve the above-mentioned desirable results, at a cost within the reach of the average householder to whom price is an important object.

It is an important purpose to provide apparatus which will quickly open the damper to wide open position when operation of the system is called for, to allow free flow through the smoke pipe, particularly at the time of the initial puff (in oil burner operation), and also to provide means which will so operate the damper after a burner operation as to permit time for purging the system of smoke and gas, before the damper closes to conserve heat.

In one form the damper is so arranged that it goes to wide open position both on starting and on stopping the burner.

With these and other objects in view, my invention consists in the construction, arrangement and combination of the various parts of my control system, whereby the objects contemplated are attained, as hereinafter more fully set forth, pointed out in my claims, and illustrated in the accompanying drawings, in which:

Figure 1 is a side elevation of a portion of a heating system showing the smoke pipe and my damper and its controlling mechanism applied thereto, with the damper in closed position, parts being broken away and parts being shown in section.

Figure 2 is an enlarged, sectional view on the line 2—2 of Figure 1 showing a draft sensitive device used for controlling the position of a damper in the smoke pipe of the heating system.

Figure 3 is a vertical sectional view of a modified form of draft sensitive device.

Figure 3A is an elevation of the device of Figure 3.

Figure 4 is a vertical, sectional view through a damper actuator (motor and brake) for controlling the positioning of a damper in the smoke pipe.

Figure 5 is an electro-diagrammatic view illustrating a form of my flow control system in which the damper swings from one closed position to a wide open position and on through toward the second closed position starting the burner motor when it is approximately wide open.

Figure 6 is a side elevation of a smoke pipe with the mercury switches on the damper shaft in their positions during stand-by periods, parts being omitted for clarity.

Figure 7 is a similar view illustrating the switch positions when the damper is in wide open position.

Figure 8 is a similar view illustrating the positions of the switches when the damper is in its other closed position.

Figure 9 is a diagrammatic view of a relay having five mercury switches and used in a modified form of my control system.

Figure 10 is a side elevation of a portion of a smoke pipe with a damper therein and mercury tube switches controlled by the position of the damper for the modified form of control system with which the relay of Figure 9 is used.

Figure 11 is a diagrammatic view showing the parts of Figure 10 in an open damper position.

Figure 12 is an electro-diagrammatic view of the circuit for the modified form of control system to which Figures 9, 10 and 11 are applicable.

Figures 1 to 8

On the accompanying drawings, I have used the reference numeral 10 to indicate a warm air furnace, the combustion chamber of which is indicated at 11. A smoke pipe 12 for combustion gases extends therefrom to a chimney 13. By the term "smoke pipe," I mean any conduit for conducting products of combustion.

A burner motor BM drives, among other parts, the fan that supplies combustion air.

In the pipe 12 is an elliptical damper D on a shaft 14 rotatably mounted in the wall of the pipe 12 and having one or both ends projected from the pipe. On a projecting end of the shaft 14 is an operating arm 15, carrying at its outer end a weight 16, and the plate 80. In the drawings the arm and plate are shown on the same end of the shaft, although they may be placed at opposite ends.

Damper motor and brake

I provide a case 17 on a base 18 (see Figure 4) suitably mounted in a stationary manner as by brackets 19 (see Figure 1) secured to the smoke 12. In the case 17 is a damper motor DM and a brake mechanism B, having an actuating coil 20. The damper motor has a brake drum 21 and a pinion 22 secured to the shaft thereof. The pinion 22 meshes with a gear 23 mounted on a shaft 24 and having a drum 25. A flexible element 26 is wound on the drum 25 and extends downwardly and is connected with the damper arm 15. The damper D constitutes a movable element for restricting or permitting flow of the combustion gases through the pipe 12.

The brake coil 20 is wound on a core 28, which, upon being magnetized by energization of the coil 20, attracts an armature 30. The brake arm 32 is connected with the armature 30 and is provided with a brake shoe 34 for contacting with the drum 21 to hold the damper in any position in which it may be placed by the motor under the control of the draft sensitive device described below.

On the sleeve 36 (Fig. 2) is a bracket 38, from which is hung a flat spring 40, insulated from the bracket.

An insulating block 42 extends from the spring 40 and supports the disc 44 in such manner that the disc 44 substantially closes but travels freely in the sleeve 36, moving toward and from the smoke pipe 12, and being directly and immediately responsive to pressure changes in the smoke pipe.

The length and cross sectional area of the sleeve 36 are such as to insure the transmission of pressure changes occurring in the pipe 12 to the disc 44 without substantial lag.

The mode of mounting the disc 44 is such as to permit its movement responsive to such pressure changes with a minimum of resistance. The movement is only that which is necessary for actuating the associated switch mechanism referred to below.

The disc may be mounted in the wall of the pipe 12 without the intervening sleeve 36,—becoming a movable portion of the wall of the pipe 12. Mounted thus, the disc is not subject to the lag that results when restricted passageways are used. I have shown the disc as round, but it can be of other shapes, and when a part of the wall of a round pipe like 12, may conform to the curve of the pipe wall.

I prefer to mount the disc in the sleeve because there it can travel through its entire range of movement without causing any appreciable change in the volume or direction of air passing the device and hence without any resulting substantial variation in pressure on the disc due to its change of position.

It will be observed that with the present mode of mounting the disc 44, the entire area of the disc is usefully effective in operating the switch. This is not true of a disc or diaphragm pivoted at two points on its periphery.

To afford simple and effective means for changing the draft maintained, I mount an adjustable weight 46 on a bar 48 supported by the spring 40. For regulating the speed of response of the disc to pressure changes, where it is desired to dampen out rapid pulsations or fluttering, I may mount on the spring 40 an adjustable inertia weight 50, which may be raised and lowered on the spring. Any effect the adjusting of this weight may have on the pressure maintained may be offset by a readjustment of the weight 46.

The switch mechanism shown in Figure 2 is intended to be electrically connected with the other parts, as shown in Figure 5.

On the sleeve 36 is a support 52 for a block of insulation 54, which is part of the switch mechanism.

The disc mechanism carries a contact bar 56. Mounted on and projecting from the block 54 are spring contact arms 60 and 62 with the contacts 64 and 58 thereon arranged to coact with the contact bar 56. The contacts 58 and 64 are so arranged that 58 makes contact first upon a movement of the disc 44 toward pipe 12.

In Figures 3 and 3A I have shown a somewhat different arrangement for the mounting of the disc of the draft sensitive device and the circuit control contacts actuated by it. In the sleeve 36′, the disc 44′ is supported by a plurality of springs 65. One end of the spring is attached to the sleeve 36′ and the other end of the spring is attached to the disc 44′. The spring between the two points of attachment follows a line approximately parallel to the disc 44′. (See Figure 3A.) This permits the disc 44′ to float freely in the sleeve 36′ toward and away from the smoke pipe 12′. (See Figure 3.)

Fastened across the open end of the sleeve 36′ is a supporting bar 66. On the bar 66 is mounted a block of insulation 67. A rod 68 is secured at its inner end to the disc 44' and extends through a guide hole 69 in the bar 66. A switch carrying arm 70 is pivoted on the insulation block 67 at 71. A wire 72 is connected to the contact arm 70. On the contact arm 70 is a double contact M. Supported on the block 67 are posts 73 and 74 in which are adjustably mounted contacts O and C.

The arrangement of Figures 3-3A has the advantage of keeping the mounting mechanism within the outline of the sleeve 36 and avoiding the use of the projecting bracket 38 and bar 48 of contact mechanism of Figure 2.

Although I have shown one contact structure with the disc arrangement of Figure 2 and another contact structure with the disc arrangement of Figure 3, it is obvious that either contacting structure may be used with either disc arrangement. It will be noted that the contact structure I have shown in Figure 3 is used with the circuits of Figure 12, and the contact structure of Figure 2 is used with the circuits of Figure 5, but a contact structure such as is shown in Figure 3 could be actuated by a disc mounted as is 44 in Figure 2 and applied to Figure 12. Likewise, the contact structure shown in Figure 2 could be actuated by a disc mounted as is 44' in Figure 3 and used with the circuit arrangement shown in Figure 5.

On the damper shaft 14 is a plate 80 on which are mounted mercury switches as follows:

Damper motor starting switch 82, pilot control switch 84, brake circuit switches 86 and 88 are connected in series with each other and with the brake circuit, and burner motor switches 90 and 92 connected in series with each other and with the burner motor.

In Figures 5 and 6, I have shown the parts in their positions when the damper is closed in stand-by position.

In Figure 5 is shown a wiring diagram for the invention as installed in a heating system having the usual burner motor BM, room thermostat RT and limit control LC. H is the hot wire and G the ground wire. By limit control I mean any well-known automatic switch used to limit the temperature or pressure produced in a heating plant, by shutting off the burner when the temperature or pressure in the plant reaches a predetermined value at which the switch has been set.

Figure 7 shows the switches in their positions assumed when the damper reaches wide open position, and Figure 8 shows the switches in the positions assumed when the damper nears its second closed position.

The circuit arrangements of the switches of Figures 5 to 8 will be more fully referred to in the description of the operation of the invention.

Definitions

By "stopper," I mean means for closing the duct or smoke pipe during stand-by periods.

By "burner" as used in this application, I mean to include any combustion means such as oil or gas burners or stokers which may be automatically controlled.

It is desirable that an adjustable stop be provided for the damper. Particularly with stokers it may be desirable to stop the damper a little farther from fully closed position, for standby periods. In Figure 1 is a threaded adjustable stop 200 projected through a cover plate 203 and a threaded collar 202 held against rotation by the cover plate and the elongated slot 201 in the pipe 12. On the stop outside the plate 203 is the locking nut 204.

I use "satisfied" as applied to the draft sensitive device to indicate that condition or position of the disc of the device when the draft is that desired.

By "pilot switch" I mean the draft sensitive disc and its associated switching mechanism, forms of which are shown in Figures 1, 2, 3 and 3A.

By "line voltage" throughout, I mean that the system is operated at the voltage of the current supply without any step down transformer.

By "holding means," I would include any means other than the motor and drive for holding the damper when the pilot switch is satisfied.

I will now describe the operation of the invention illustrated in Figures 1 to 8.

I will preface the detailed explanation of the circuit closing operations with a general explanation of the functioning of the device.

One of the important features of this device is the starting of the combustion equipment with the smoke pipe approximately wide open. This is accomplished by dividing the operation into two parts. In the first part, the damper is moved from its closed position to approximately wide open position. The second part of its operation involves the regulation of the draft. The damper moves into this regulating range by moving beyond wide open position and toward its second closing position. Switching mechanism has been provided to get the damper from its first closed position into the wide open position and at approximately this point, the burner circuit is closed and the pilot switch that controls the draft is put into service. The burner circuit closing point may be varied by adjusting the position of the switch 90 which is easily done. (See Fig. 7.) Through this central portion of its movement, a brake is applied to prevent the damper falling to its stand-by position. The application of this brake overlaps the disconnecting of the damper opening circuit and the closing of the circuit to the pilot switch.

When the room thermostat calls for heat, a circuit will be closed, if LC is closed, from H through RT, LC, 82 and DM to G, thus energizing the damper motor for moving the damper D from its normally closed position of Figure 6 to its substantially wide open position of Figure 7.

The switches 86—88 are so mounted on the plate 80 that a circuit is closed through them just before the damper reaches its open position of Figure 7, thereby closing a circuit through the coil 20 and applying the brake.

The switches 90—92 (Fig. 7) and Y (Fig. 10) may be made adjustable by any simple method of mounting switch holding clamps so as to close the motor circuit at the desired time with relation to full open damper position, so as to permit initial puff just when the damper reaches full open position. This may be desirable for applying the control to different burners and furnaces.

During the opening movement of the damper and just after the switch 86 closes, the switch 84 closes for putting the draft sensitive device into service.

When the damper reaches wide open position, the switches 90 and 92 are in position for closing a circuit through the burner motor and the damper motor switch 82 is open and the damper motor circuit is broken.

The burner starts and draft is created in the pipe 12. Thereafter and in normal operation, the damper after passing wide open position will travel through what may be called its regulating range under the control of the pilot switch.

On the first increase in draft, after the damper has reached wide open position, the disc 44 moves toward pipe 12 and contact bar 56 engages contact 58 and completes a circuit from H through RT, LC, switch 84, contact bar 56, contact 58, coil 20 to G. This parallels the circuit through 86—88. At this point contacts 56, 58 engage but contacts 56, 64 do not, and the draft sensitive device is considered "satisfied."

The increase in draft necessary to bring contact 56 into engagement with contact 64 is the differential of the control and can be changed by changing the gap between 56 and 64.

Such further increase in draft sufficient to cause the disc 44 to move contact bar 56 to contact 64, completes a circuit from H through RT, LC, switch 84, contact bar 56, contact 64, DM to G.

The damper motor moves D further into the regulating range to restrict passage of combustion gases through pipe 12 and reduce the draft. This results in movement of disc 44 away from the smoke pipe 12 far enough to break contact between 56 and 64, thus opening the damper motor circuit and stopping movement of the damper. The damper is held in its new position by the brake.

A further reduction in draft will result in movement of disc 44 further from pipe 12 and the breaking of contact between 56 and 58, and opening the brake coil circuit and releasing the brake. This permits weight 16 to move the damper toward wide open position, thus opening the gas passage through pipe 12, to increase the draft.

When the draft increases the disc moves toward smoke pipe 12 and contact bar 56 again engages contact 58, once more closing the circuit through coil 20 and applying the brake for holding the damper in its new position.

Any subsequent change in the draft will cause the disc to play through the cycle just described until RT or LC is satisfied, at which time both the damper motor and brake coil are deenergized and the weight 16 returns the damper D to position shown in Figures 1 and 6.

Both the opening and the closing of switches 82 and 84 and 90 take place while both 86 and 88 are closed or, in other words, while the brake is applied.

This overlapping of switch operation is to insure passing from the starting range to the regulating range without any gap.

If some abnormal condition should arise that would result in the moving of the damper so far toward its second closing position that it would become inadvisable to continue operation of the burner, the burner will be stopped by the opening of the switch 92.

The position of this switch may be adjustable by any suitable means so that this point may be varied, and this opening takes place some place between the two positions shown in Figures 7 and 8.

It will be noted that though there may be no draft in the chimney when the room thermostat calls for heat, the brake will hold the damper in the wide open position.

Likewise any sudden reduction in the draft that would cause the disc 44 to move away from the smoke pipe 12 opening both the brake circuit and the damper motor circuit through the pilot switch, will permit the damper to move from a point near its second closed position toward its wide open position, where it will be caught and held by the brake, energized through the switches 86 and 88.

It will be held in this position until the room thermostat or limit control is satisfied or until a movement of the disc 44 again closes the circuit through the damper motor.

Upon the satisfying of either the room thermostat or the limit control, both the damper motor and the brake are deenergized, and the weight 16 returns the damper to the position shown in Figure 6.

Among the advantages found in the control here described may be mentioned the following:

There is provided mechanism for controlling the draft during burner operation to aid in maintaining proper combustion with a minimum waste of heat through the stack.

Likewise by the provision of the stopper feature, heat is conserved in the system when the burner is not operating.

Important among the advantages of my system are the accuracy and sensitiveness of its operation and the economy of installation which makes it available for domestic use.

It will be noted that I have designed electrical equipment, which may be line voltage throughout, where the ruggedness and simplicity of a line voltage arrangement is desired. Low voltage may be used in part by using standard relays for the line voltage equipment.

It will be noted that on account of the great area of the draft sensitive member 44, and its close proximity to the smoke pipe and the large cross sectional area of the passage between it and the smoke pipe, this draft sensitive device responds almost instantly to changes in pressure in the smoke pipe. This prompt response of the pressure sensitive member makes possible the use of a faster moving damper with a minimum probability of hunting.

The use of the brake as herein explained still further reduces the tendency to hunt.

By using a non-stalling brake of this kind it is not necessary to open the brake coil circuit except when it is necessary to increase the draft. Changes in the other direction are made with the brake applied and the brake circuit closed. This minimizes wear on the brake circuit contacts and other parts.

It is obvious where a damper controls flow through a duct under the control of a pressure sensitive device, that the damper should be stopped as close as possible to the position in which the desired pressure may find it. This means that the pressure sensitive device must move into its satisfied position in a minimum length of time after the desired pressure in the duct has been established. Likewise any change in pressure from that desired should result in an immediate response on the part of the draft sensitive device. The slower the response of the draft sensitive device to pressure changes, the more probability there is that there will be a lag between pressure changes and damper movement, and the more lag there is, the more tendency there will be on the part of the damper to overrun the desired position and to set up a hunting action.

It is therefore desirable that response of the pressure sensitive device to pressure changes in the duct should be as nearly instantaneous as possible. Pressure sensitive devices heretofore have failed to respond as quickly as is desirable, due to a variety of causes.

Among these is the lag in communication (between the duct and the movable element of the pressure sensitive device) through restricted passageways, perhaps of small area or great length or both.

Another of these causes is the friction of bearings supporting the movable element.

Where the movable element is a diaphragm, there is, of course, resistance to flexing at the edges and there is a varying effectiveness of the diaphragm from center to periphery. This is also true of bellows.

In ordinary cross-hung dampers, part only of the area of the damper is usefully effective. The area on the opposite side of the pivots from the useful area has a detrimental effect.

Such a movable element, to accomplish its purpose, must necessarily be larger than one moving in its entirety in one direction, and this greater area involves a greater mass with greater inertia.

Inverted cups in oil baths respond with varying speeds as changes in temperature change the viscosity of the oil.

If pistons and cylinders were used in place of diaphragms or bellows or inverted cups, the friction of the piston on the cylinder wall would produce a lag.

In all of these forms described, as commonly known and used, connections to the source of pressure are made through long ducts of restricted area.

The disadvantages of all these prior devices are avoided with the form of structure here shown.

The arrangement insures movement of the damper to full open position before the burner circuit is closed for starting, and allows proper time for purging, when the burner circuit is opened.

When, as is frequently the case, there is little or no draft in the chimney, when the burner starts, it is an advantage to have the damper wide open, where it offers the least restriction to flow.

The initial puff will drive less gas through the fire door or other openings when there is minimum restriction in the combustion gas outlet.

Upon stopping the burner, the time required for closing movement of the damper, affords a purging period.

During this purging period, the damper moves from a flow restricting position to wide open position and then on to stand-by position, affording for at least an instant the full pull of the available chimney draft or (Figs. 9–12) the damper movement to closed position is slow.

*Figures 9–12*

In Figures 9–12 I have shown another form of control adapted for use in a similar environment. In the pipe 12' is a damper D' which is round but might be elliptical like D. D' is mounted on a damper shaft 14' having an arm 15'. A relay assembly RA shown in Figure 9 is suitably located. The draft sensitive disc is shown at 44', Figure 12.

In Figures 9–12 the relay shown in Figure 9, is provided with mercury tube switches 94, 95, 96, 97 and 98. On the damper arm 15 are switches X, Y and Z (Figs. 10–11).

The switches 94 and 97 of the relay are normally closed while the switches 95, 96 and 98 are normally open. Whenever the relay assumes a reversed position because of being energized, the switches 94 and 97 are thereby opened and the switches 95, 96 and 98 are thereby closed.

The damper D' is shown in closed position in Figure 10 and in open position in Figure 11.

Immediately after leaving closed position, the switches X and Y, which are normally open, will close, while the switch Z, which is normally closed, will not open until the position of Figure 11 is reached. The switches 94, 95, 96, 97 and 98 and X, Y and Z are connected with the relay coil RC', a room thermostat RT', a limit control LC', the hot and ground line wires H' and G', a burner motor BM', a reversing type damper motor DM'. The disc 44' carries the common contact M which coacts with stationary contacts O and C.

The opening and closing terminals of the motor DM' are indicated at O' and C' respectively.

*Operation*

In the operation of the system shown in Figures 9 to 12, the room thermostat RT' upon closing, will energize the relay coil RC' if LC' is closed. This tips all the switches 94, 95, 96, 97, and 98 to the opposite position from that shown in Figures 9 and 12. A circuit is then established from H' through RT', LC', 96, wire a, opening contacts M and O, 95, Z, terminal O', then through the damper motor DM' and 100 to G'. This opens the damper and soon after it leaves the closed position, the switches X and Y are closed. Closing of the switch Y causes the burner motor BM' to operate, its circuit being traceable from H' through RT', LC', 98, Y, BM' to G'. Closing the switch X does not produce any result since the switch 94, in series with it, is in open circuit position.

As the draft increases, the disc 44' will cause the contacts O—M to open, while a further increase will close contacts M—C. Upon closing of these contacts, the damper motor DM' will be energized by the circuit from H' through RT', LC', 96, a, MC, C', DM', 100 to G', for moving the damper toward closed position.

During operation of the burner, the contact M will engage contacts O and C, upon variation in draft, thereby adjusting the damper to the proper position for the required draft.

When either the room thermostat or the limit control is opened, the switches 94, 95, 96, 97 and 98 assume the position shown in Figures 9 and 12, whereupon a circuit is established from H' through 94, a resistance R, X, a, 97, C', DM', 100 to G' for causing the damper D' to return toward its closed position. Return will be slowed down by the resistance R as it is desirable to have relatively slow closing thereof for best results in purging.

As soon as the circuit is opened through the switch X, which is just prior to the closed position of the damper in Figure 10, the damper motor will be de-energized, and the damper will stop in this position where it will remain until the room thermostat and limit control, again call for the operation just described. When the damper is in closed position, the disc 44' will call for an increase in draft, and in the then position of the disc 44', the contacts M and O will be closed, and these contacts will remain closed until the damper motor DM' has again opened the damper far enough to permit the chimney draft to again act on the disc 44'.

As to the purposes of each of the switches, it will be noted that the switch 94 establishes a shunt circuit around the room thermostat and the limit control in order to close the damper when either the room thermostat or the limit control opens. The switch X limits the movement of the damper toward its closed position.

The switch 95 establishes a damper opening circuit through the damper motor after the room thermostat closes, which circuit is also traceable through the switches Z and 96.

The switch 95 also serves to open the damper opening circuit following the satisfying of RT' or LC' so that the damper may be driven to the closed position where it is to remain until the next time RT' and LC' call for heat.

The switch Z limits the opening of the damper, because when the position of Figure 11 is reached, this switch is tipped to its open position.

The switch 96 energizes the damper motor after the room thermostat closes, and places the damper motor in control of the draft responsible disc 44'. Switch 96 primarily serves to prevent the completion of a circuit through RC' after RT' or LC' has opened.

Upon satisfying RT' or LC' the relay coil RC is deenergized and the switches 94—98 return to position of Figures 9 and 12. Since the damper is still open and switch X is still closed, this action of the relay establishes a circuit from H' through 94, R, X, a, 97, C', DM', 100 to G'. This causes DM' to move the damper toward closed position. As the damper reaches closed position, switch X opens, breaking the circuit and de-energizing damper motor DM'.

The switch 98 controls the burner motor for the purpose of de-energizing it whenever the relay coil is de-energized, thus de-energizing the burner motor at the time the room thermostat is satisfied, while the switch Y in series therewith, serves to delay starting of the burner motor until after the damper has been partly opened. The switch Y is therefore the starting switch for the burner motor and the switch 98 is an additional safety switch.

The switch Y will also serve to stop the burner motor, if the damper should too closely approach its closed position, through some failure of the damper motor or the pilot switch.

With the form disclosed in Figures 9–12, it is possible to use larger and heavier dampers with more powerful damper motors, which may be back-geared.

These advantages are gained with a minimum of operative mechanism and hence at minimum expense. The simplicity of the design makes for reliability in operation.

This same equipment in other forms can be used to control the flow of fluids other than air and gas.

It will be seen from the foregoing description and explanation of the operation of my device that here are general features involved, which may be embodied in different forms of structure, and it is my purpose to cover by my claims any forms of structure and any changes in arrangement which may be fairly within the scope of my invention.

I claim as my invention:

1. In a heating system having a furnace, a smoke pipe, a damper therein, a burner motor and a fan operated thereby for driving air through the furnace and a room thermostat for starting and stopping the burner motor, control means for moving the damper from closed position to full open position and beyond when the thermostat calls for heat and means for moving the damper to full open position and then to closed position, when the room thermostat is satisfied.

2. In a control system for use with a heating system having a burner, a smoke pipe and a cross damper in the pipe, means to move the damper from approximately closed position to wide open position and beyond, electrical means for starting the burner when the damper reaches approximately wide open position, and other means operative when the damper is approximately wide open or beyond for adjusting the damper during burner operation to maintain a predetermined draft in the smoke pipe and means for returning the damper through wide open to closed position when the damper is released from control of the last above mentioned means.

3. In a control mechanism for use in a system having a burner, a smoke pipe and a cross damper in the pipe, means to move the damper from approximately closed position to wide open position and beyond, electrical means for starting the burner when the damper reaches approximately wide open position, and other means operative when the damper is approximately wide open or beyond for adjusting the damper during burner operation to maintain a predetermined draft and means including a switch positively opened by damper movement to stop the burner whenever the damper approaches a closed position.

4. In a control mechanism for use in a system having a burner, a smoke pipe and a cross damper in the pipe constrained to move toward closed position, a motor connected with the damper and adapted when energized to move the damper from approximately closed position to wide open position and beyond, electrical means for starting the burner when the damper reaches approximately wide open position, and means operative when the damper reaches approximately wide open position for adjusting the damper through a range beyond wide open position to maintain a predetermined draft during burner operation.

5. In a control system for a heating system having a room thermostat, a burner motor, a smoke pipe, a damper therein, and a device sensitive to draft in the pipe, a damper operating motor, means for including the damper motor in a circuit to be closed when the room thermostat calls for heat for thereby opening the damper, means including a switch positively actuated by the damper for starting the burner motor when the damper opens and stopping the burner motor when the damper closes, means actuated by damper movement for putting the draft sensitive device into service, means controlled by the draft sensitive device for then controlling the damper motor for regulating the damper position according to draft position in the pipe.

6. A damper control structure for use with a system having a duct, a damper in the duct, a means for moving fluid through the duct, and a switch for controlling said means, comprising a member subject to and sensitive to pressure in the duct, consisting of a disc having one face only subject to pressure in the duct substantially without restriction, movable according to changes in pressure in the duct, electrical means for moving the damper to approximately open position when the switch is actuated to cause operation of said first named means, means for putting the pressure sensitive device into service after the switch has been actuated, means controlled by the pressure sensitive device for then regulating the open position of the damper according to the pressure in the duct, and means independent of the damper opening means for closing the damper when the switch is reversely operated.

7. In a control system for use with a heating system having a burner, a smoke pipe and a cross damper in the pipe, means to move the damper from approximately closed position to wide open position and beyond, and means operative when the damper is approximately wide open or beyond for adjusting the damper during burner operation to maintain a predetermined draft in the smoke pipe.

8. In a damper control structure for use with a heating system having a smoke pipe, a damper therein, a burner motor, a thermostat, and a draft sensitive member subject to conditions in the smoke pipe, power means adapted to become operative when the thermostat calls for heat, said power means being connected with the damper and arranged when operated to move the damper from closed to wide open position and beyond, damper controlled means for starting the burner motor when the damper reaches wide open position, and means for then putting the damper under control of the draft sensitive member for regulating the position of the damper while wide open or beyond, according to draft conditions, the damper being mounted to return to closed position by gravity when the thermostat is satisfied, whereby when the damper returns to closed position it must travel from wide open position or beyond for affording a longer purging period than if the damper should move from partly open position to closed position when the thermostat is satisfied.

9. In a damper control structure for use with a heating system having a smoke pipe, a damper therein, a burner motor, a thermostat, and a draft sensitive member subject to conditions in the smoke pipe; power means adapted to become operative when the thermostat calls for heat, said power means including an electric motor connected with the damper and arranged when operated to move the damper quickly from closed to wide open position and beyond, damper controlled means for starting the burner motor when the damper reaches wide open position, and means for then putting the damper under control of the draft sensitive member for regulating the position of the damper while wide open or beyond, according to draft conditions, the damper being mounted to return to closed position by gravity when the thermostat is satisfied, whereby when the damper returns to closed position it must travel from wide open position or beyond, for thus affording a longer purging period than if the damper should move from partly open position to closed position when the thermostat is satisfied.

10. In a damper control structure for use with a heating system having a smoke pipe, a damper therein, a burner motor, a thermostat, and a draft sensitive member subject to conditions in the smoke pipe, power means adapted to become operative when the thermostat calls for heat, said power means being connected with the damper and arranged when operated to move the damper from closed to wide open position and beyond, damper controlled means for starting the burner motor when the damper reaches wide open position, and means for then putting the damper under control of the draft sensitive member for regulating the position of the damper while wide open or beyond, according to draft conditions, the damper being mounted to return to closed position by gravity when the thermostat is satisfied, whereby when the damper returns to closed position it must travel from wide open position or beyond for affording a longer purging period than if the damper should move from partly open position to closed position when released at the satisfying of the thermostat, and damper controlled means including a switch positively opened when the damper approaches closed position for stopping the burner motor.

11. In a damper control structure for use with a heating system having a smoke pipe, a damper therein, a burner motor, a thermostat and a draft sensitive member subject to conditions in the smoke pipe, power means adapted to become operative when the thermostat calls for heat and being connected with the damper for moving the damper from closed to wide open position and beyond, damper controlled means for starting the burner motor when the damper approaches wide open position, means for then putting the damper under control of the draft sensitive member for regulating the position of the damper while wide open or beyond according to draft conditions, means for constraining the damper for movement toward closed position, and means for holding the damper to prevent its being moved beyond wide open position toward closed position when the room thermostat is calling for heat.

WILLIAM W. STUART.